United States Patent
Zhang et al.

(10) Patent No.: US 9,338,739 B2
(45) Date of Patent: May 10, 2016

(54) METHOD AND DEVICE FOR SELECTING NETWORK ON WHICH MULTIMODE TERMINAL IS TO RESIDE AND MULTIMODE TERMINAL

(75) Inventors: Hong Zhang, Shenzhen (CN); Hua Zhang, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/394,866

(22) PCT Filed: Jun. 5, 2012

(86) PCT No.: PCT/CN2012/076483
§ 371 (c)(1),
(2), (4) Date: Oct. 16, 2014

(87) PCT Pub. No.: WO2013/155763
PCT Pub. Date: Oct. 24, 2013

(65) Prior Publication Data
US 2015/0072684 A1    Mar. 12, 2015

(30) Foreign Application Priority Data

Apr. 16, 2012   (CN) .......................... 2012 1 0111456

(51) Int. Cl.
*H04W 4/00*    (2009.01)
*H04W 48/18*   (2009.01)
(Continued)

(52) U.S. Cl.
CPC .............. *H04W 48/18* (2013.01); *H04W 24/02* (2013.01); *H04W 36/14* (2013.01); *H04W 36/165* (2013.01); *H04W 52/0245* (2013.01); *H04W 88/06* (2013.01); *Y02B 60/50* (2013.01)

(58) Field of Classification Search
CPC ..... H04W 48/18; H04W 24/02; H04W 88/06; Y02B 60/50
See application file for complete search history.

(56) References Cited

U.S. PATENT DOCUMENTS 6,400,946 B1 * 6/2002 Vazvan ............... H04B 7/18563
455/432.1
2003/0224819 A1 * 12/2003 Sanchez ............... H04W 88/06
455/552.1
(Continued)

FOREIGN PATENT DOCUMENTS

CN    1607852 A      4/2005
CN    101562870 A    10/2009
(Continued)

OTHER PUBLICATIONS

International Search Report issued from corresponding PCT/CN2012/076483, dated Jan. 24, 2013.

*Primary Examiner* — Erin File
(74) *Attorney, Agent, or Firm* — Banner & Witcoff, Ltd.

(57) ABSTRACT

Disclosed are a method and device for selecting a network on which a multimode terminal is to reside and a multimode terminal. The method comprises: a service type of a network service which is currently performed by the multimode terminal is obtained; a current signal intensity of each network in the current environment for the multimode terminal is detected; power consumption information that the multimode terminal currently performs the network service is obtained; and according to preset relationships among a signal intensity, a service type and a power consumption reference value of each network, the obtained power consumption information, the detected current signal intensity of each network and the obtained service type, a network on which the multimode terminal is to reside is selected.

14 Claims, 3 Drawing Sheets

(51) Int. Cl.
*H04W 24/02* (2009.01)
*H04W 88/06* (2009.01)
*H04W 36/14* (2009.01)
*H04W 36/16* (2009.01)
*H04W 52/02* (2009.01)

(56) References Cited

U.S. PATENT DOCUMENTS

| | | | | |
|---|---|---|---|---|
| 2006/0146766 A1* | 7/2006 | Nakajima | ............. | H04W 76/02 370/338 |
| 2006/0268711 A1* | 11/2006 | Doradla | ............. | H04L 12/5692 370/235 |
| 2006/0282554 A1* | 12/2006 | Jiang | ............. | H04W 8/183 710/14 |
| 2007/0038764 A1* | 2/2007 | Maillard | ............. | H04L 12/5692 709/229 |
| 2007/0053370 A1* | 3/2007 | Aghvami | ............. | H04W 8/18 370/401 |
| 2007/0123260 A1* | 5/2007 | Kim | ............. | H04W 36/0066 455/436 |
| 2007/0147303 A1* | 6/2007 | Noh | ............. | H04W 36/0055 370/331 |
| 2007/0195733 A1* | 8/2007 | Noh | ............. | H04W 36/0083 370/331 |
| 2007/0249354 A1* | 10/2007 | Seo | ............. | H04W 36/30 455/436 |
| 2008/0207187 A1* | 8/2008 | Maillard | ............. | H04M 1/72522 455/418 |
| 2009/0190533 A1* | 7/2009 | Zhu | ............. | H04L 29/12188 370/328 |
| 2010/0022243 A1* | 1/2010 | Oommen | ............. | H04W 48/18 455/435.3 |
| 2012/0003944 A1* | 1/2012 | Bai | ............. | H04W 48/18 455/73 |
| 2012/0163219 A1* | 6/2012 | Lee | ............. | H04W 60/005 370/252 |
| 2013/0100845 A1* | 4/2013 | Noh | ............. | E04F 11/1817 370/252 |
| 2015/0065134 A1* | 3/2015 | Vandemoere | ..... | H04W 36/0022 455/436 |

FOREIGN PATENT DOCUMENTS

| | | |
|---|---|---|
| CN | 101651972 A | 2/2010 |
| CN | 101795477 A | 8/2010 |

* cited by examiner

METHOD AND DEVICE FOR SELECTING NETWORK ON WHICH MULTIMODE TERMINAL IS TO RESIDE AND MULTIMODE TERMINAL

TECHNICAL FIELD

The disclosure relates to the field of communications, and in particular to a method and device for selecting a network on which a multimode terminal is to reside and a multimode terminal.

BACKGROUND

With the continuous development of mobile terminals, functions of the mobile terminals have turned from a single call function to more and more network applications, thus providing more and more services for users. Such as mailbox, microblog, Tencent QQ, stockmarket online, mobile phone Internet surfing, group buying site and games. As a "palm computer" which is carried around, a mobile terminal has an increasingly apparent purpose, and people increasingly rely on the mobile terminal. However, the current battery technology cannot balance the contradiction between size and charge capacity. Therefore, how to reduce the power consumption of a mobile terminal so as to prolong the stand-by time of the mobile terminal has become a common question that needs to be considered for the current mobile terminals.

A market research shows that, in the situation where 2G, 3G, 4G and wifi networks coexist, time for daily using a mobile terminal by people on average varies from four to eight hours; in addition, powerful entertainment functions of a mobile terminal, such as graphics processing and colourful LCD screen all may consume large electric quantity.

SUMMARY

With regard to the problem of how to reduce the power consumption of a mobile terminal so as to prolong the stand-by time of the mobile terminal, the disclosure provides a method and device for selecting a network on which multimode terminal is to reside on and a multimode terminal.

According to an embodiment of the disclosure, a method for selecting a network on which a multimode terminal is to reside on is provided. The method comprises: obtaining a service type of a network service which is currently performed by the multimode terminal; detecting a current signal intensity of each network in the current environment for the multimode terminal; obtaining power consumption information that the multimode terminal currently performs the network service; and according to preset relationships among a signal intensity, a service type and a power consumption reference value of each network, the obtained power consumption information, the detected current signal intensity of the each network and the obtained service type, selecting the network on which the multimode terminal is to reside, wherein the selected network is a network with minimum power consumption reference value, which is corresponding to the current signal intensity and the service type, in networks in each of which a current signal intensity can ensure the network service is performed.

Preferably, selecting the network on which the multimode terminal is to reside comprises: if signals of multiple networks are detected, and current signal intensities of the multiple networks are all less than a threshold, taking the multiple networks as candidate networks, and selecting a network on which the mobile terminal is to reside from the candidate networks; and if signals of multiple networks are detected, and one or more networks of which current signal intensities are not less than the threshold exist in the multiple networks, taking the one or more networks of which the current signal intensities are not less than the threshold as the candidate networks, and selecting the network on which the mobile terminal is to reside from the candidate networks.

Preferably, selecting the network on which the multimode terminal is to reside from the candidate networks comprises: querying the relationships to respectively obtain, at the same signal intensity, a power consumption reference value p, wherein the power consumption reference value p is corresponding to a service type of the network service, which is currently performed and is corresponding to each network in the candidate networks; and selecting a network on which the multimode terminal is to reside from the candidate networks, the selected network being with minimum power consumption reference value.

Preferably, before selecting the network on which the multimode terminal is to reside from the candidate networks, the method further comprises: querying a relationship between a preset service type and a signal intensity dependence weight, and obtaining a signal intensity dependence weight x corresponding to the service type of the network service which is currently performed, wherein $0 \leq x \leq 1$; and selecting the network on which the multimode terminal is to reside from the candidate networks comprises: respectively calculating a signal intensity and a power consumption comprehensive reference value v for each network in the candidate networks according to the following formula: $v = x*e + (1-x)/p$, where e is a normalization value of the current signal intensity in the detected network; and selecting, from the candidate networks, a network with maximal signal intensity and power consumption comprehensive reference value as the network on which the multimode terminal is to reside.

Preferably, if the number of the service type of the network service which is currently performed by the multimode terminal is more than one, the obtained signal intensity dependence weight is a maximal signal intensity dependence weight in signal intensity dependence weights corresponding to the more than one service types.

Preferably, obtaining the power consumption information that the multimode terminal currently performs the network service comprises: determining, by obtaining an electric quantity consumption speed of the multimode terminal in a current predetermined interval, a current power consumption value of the multimode terminal.

Preferably, after obtaining the power consumption information that the multimode terminal currently performs the network service, the method further comprises: updating a power consumption value, in the relationships, corresponding to a current signal intensity of a current network on which the multimode terminal resides and the service type of the network service which is currently performed.

According to another embodiment of the disclosure, a device for selecting a network on which multimode terminal is to reside is provided. The device comprises: a service selection module, configures to obtain a service type of a network service which is currently performed by the multimode terminal; a detection module, configured to detect a current signal intensity of each network in the current environment for the multimode terminal; a current power consumption obtaining module, configured to obtain power consumption information that the multimode terminal currently performs the network service; and a network selection module, configured to select, according to preset relationships among a signal intensity, a service type and a power consumption reference value of each network, the obtained power consumption information, the detected current signal intensity of the each network and the obtained service type, the network on which the multimode terminal is to reside, wherein the selected network is a network with minimum power consumption reference value, which is corresponding to the current signal intensity and service type, in networks in each of which a current signal intensity can ensure that the network service is performed.

Preferably, the device further comprises: a power consumption state maintenance module, configured to update a power consumption value, in the relationships, corresponding to a current signal intensity of a current network on which the multimode terminal resides and the service type of the network service which is currently performed.

According to yet another embodiment of the disclosure, a multimode terminal is provided, and the multimode terminal comprises the above-mentioned device for selecting the network on which the multimode terminal is to reside.

The disclosure can be applied to select, according to the service type of the network service which is currently performed by the multimode terminal and the signal intensity of each network in the current environment, a network with minimum power consumption for the multimode terminal to reside on, wherein the selected network can ensure the network service to be performed. Therefore, the power consumption of the multimode terminal is saved as far as possible for a user and the endurance time of the multimode terminal is prolonged, thus improving the user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. It should be noted that the embodiments of the present application and the characteristics of the embodiments can be combined with each other if no conflict is caused.

Embodiment 1

Figure 1:
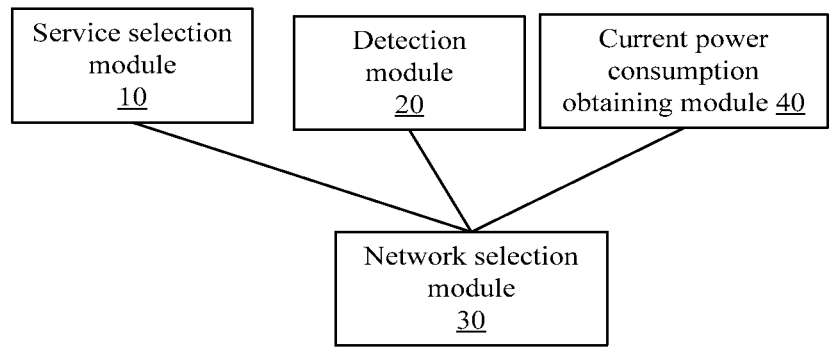
FIG. 1 is a schematic structural diagram of a device for selecting a network on which a multimode terminal is to reside according to an embodiment of the disclosure.

FIG. 1 is a schematic structural diagram of a device for selecting a network on which a multimode terminal is to reside according an embodiment of the disclosure.

As shown in FIG. 1, the device mainly comprises: a service selection module 10, a detection module 20, a current power consumption obtaining module 40, and a network selection module 30. Each functional module is described below, respectively.

A service selection module 10 is configured to obtain a service type of a network service which is currently performed by the multimode terminal.

In the present embodiment, the network service which is performed by the multimode terminal comprises but is not limited to: multimedia messages, listening to songs online, online reading, network games, webpage browsing, video calls, instant messaging (such as QQ and Fetion), etc. Different services of the multimode terminal correspond to different power consumption, for example: the power consumption of video calls and network games, etc. is relatively high; moreover, listening to songs online, webpage browsing, etc. are also light screen operations of network interaction, and the power consumption is also relatively high; however, QQ and Fetion are services that may run in the background, with power consumption being relatively low, and may be run for a long time by a user.

A detection module 20 is configured to detect a current signal intensity of each network in the current environment for the multimode terminal.

In the present embodiment, the multimode terminal may be a mobile terminal which comprises various types of network modes, such as a TD network, an LTE network and an EDGE network and a WIFI network; and in a certain environment, the above-mentioned four network signal may be strong or weak. Therefore, detection module 20 detects and obtains different network signal intensities.

A current power consumption obtaining module 40 is configured to obtain power consumption information that the multimode terminal currently performs the network service.

A network selection module 30 is coupled with the service selection module 10, the detection module 20 and the current power consumption obtaining module 40, and is configured to select, according to preset relationships among a signal intensity, a service type and a power consumption reference value of each network, the power consumption information obtained by the current power consumption obtaining module 40, the current signal intensity of each network detected by the detection module 20 and the service type obtained by the service selection module 10, the network on which the multimode terminal is to reside, wherein the selected network is a network with minimum power consumption reference value, which is corresponding to the current signal intensity and service type, in networks in each of which a current signal intensity can ensure that the network service is performed.

In a practical application, power consumption regarding different services is different in networks of different signal intensities; therefore, the relationships between the signal intensity, the service type and a power consumption reference value of each network may be preset. For example, the relationships may be recorded via a power consumption state table; the network selection module 30 may select, according to the current signal intensity of each network detected by the detection module 20, and the service type obtained by the service selection module 10 and the power consumption information obtained by the current power consumption obtaining module 40, a corresponding network that a power consumption reference value currently is relatively low from the power consumption state table. Preferably, in order to ensure that the network service is performed, the current signal intensity of the network selected by the network selection module 30 may ensure that the network service can be performed.

For example, the network selection module 30 may detect, according the current signal intensity of each network detected by the detection module 20, whether one or more networks of which current signal intensities are not less than a preset threshold exist; if yes, the network on which the multimode terminal is to reside is selected from the one or more networks of which the current signal intensities are not less than the pre-set threshold; otherwise the network on which the multimode terminal is to reside is selected from networks with detected signals.

Of course, if the detection module 20 may only detect one network with detected signal, the network selection module 30 directly select the network; or if the detection module 20 detects that there is only one network, the current signal intensity of which is not less than the preset threshold, in networks with detected signal, the network selection module 30 directly select the network.

In the embodiment of the disclosure, the above-mentioned device for selecting the network on which the multimode terminal is to reside selects, according to the obtained signal intensity of each network, the relationships among the service type, the signal intensity and the power consumption reference value of the network service, a network, in which the power consumption is low and the signal intensity can ensure that the network service can be performed, for the multimode terminal to reside on. Thus when a user service is ensured to be performed, the power consumption of a multimode terminal is reduced as far as possible and the electric quantity of the multimode terminal is saved, and thus the stand-by time of the multimode terminal is prolonged.

Embodiment 2

In a practical application, in a case that the signal intensity is the same and the network is the same, if a multimode terminal is in different environments, the power consumption of the multimode terminal may also be different. For example, in a case that the signal intensity is the same and the GSM network is the same, the power consumption for running QQ on a mobile phone may be different in a bustling downtown and in a desolated area of the suburb, and the later is lower. Therefore, the relationships among the signal intensity, the service type and the power consumption reference value of the above-mentioned each network may be dynamically adjusted according to environments.

Figure 2:
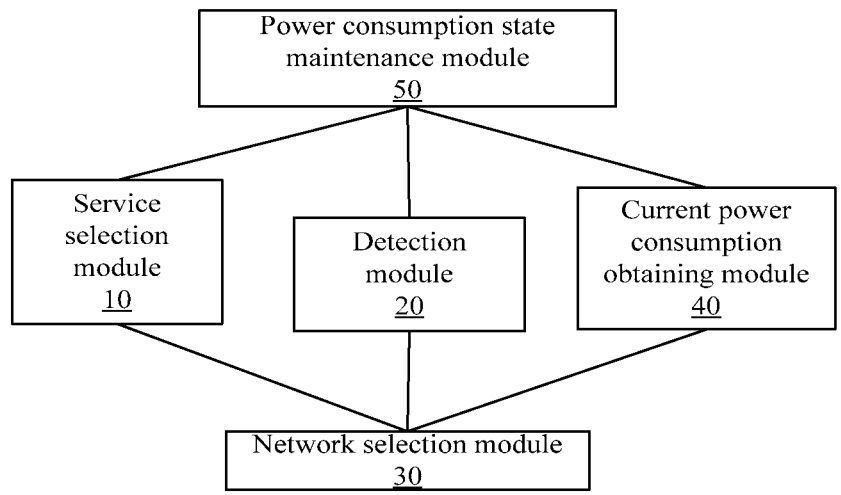
FIG. 2 is another schematic structural diagram of a device for selecting a network on which a multimode terminal is to reside according to a preferred embodiment of the disclosure.

In a preferred implementation of the present embodiment, the above-mentioned relationships may be updated according to the current power consumption information of the multimode terminal. Therefore, as shown in FIG. 2, a power consumption state maintenance module 50 may be provided on the device for selecting the network on which the multimode terminal is to reside in the embodiment of the disclosure. The power consumption state maintenance module 50 is coupled with a current power consumption obtaining module 40, and is configured to update a power consumption reference value, in the relationships, corresponding to a current signal intensity of a current network for the multimode terminal to resides on and the service type of the network service which is currently performed. That is, the power consumption reference value is updated to be a power consumption value corresponding to the power consumption information obtained by the current power consumption obtaining module 40.

In the present embodiment, by dynamically maintaining the relationships among the service type, the network signal intensity and the power consumption reference value of different services, latest power consumption values corresponding to the different services may be obtained when the multimode terminal is in different environments, thus improving the accuracy of network selection.

Embodiment 3

The present embodiment provides a multimode terminal, and the multimode terminal comprises the device as claimed in the above-mentioned embodiment 1 or embodiment 2.

In a preferred implementation of the present embodiment, a network selecting module may be provided between an RIL (Radio interface Layer) and a Framework of a multimode terminal, and the function of the above-mentioned device for selecting the network on which the multimode terminal is to reside is realized via the network selecting module.

Figure 3:
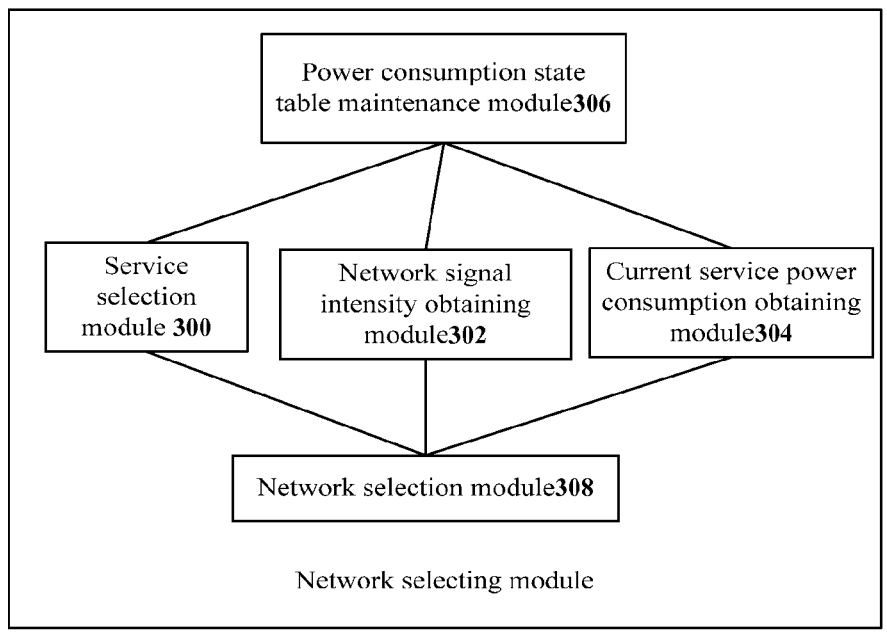
FIG. 3 is a schematic structural diagram of a network selecting module of a mobile phone according to a preferred implementation of an embodiment of the disclosure.

Taking a mobile phone as an example, FIG. 3 is a schematic structural diagram of a network selecting module of a mobile phone according to a preferred implementation of an embodiment; and as shown in FIG. 3, the network selecting module is composed of five components, a service selection module 300, a network signal intensity obtaining module 302, a current service power consumption obtaining module 304, a power consumption state table maintenance module 306 and a network selection module 308.

The service selection module 300 is configured to obtain a service currently used by a user. Services such as, listening to songs online, mobile phone reading, network games, mobile phone accessing Internet, mobile phone videos, Renren, Kaixin and Sina microblog. Services of a terminal corresponds to different power consumption, for example: the power consumption of mobile phone videos and network games, etc. is relatively high; moreover, listening to songs online, Sina microblog, etc. are light screen operations of network interaction, and the power consumption is also relatively high; however, mobile phone QQ and Fetion may be services that can run in the background, and may be run for a long time by a user.

The network signal intensity obtaining module 302 (equivalent to the above-mentioned detection module 20) is configured to read a signal intensity of each network in the current environment. Such as the current signal intensity of a TD network, an LTE network, an EDGE network and a WIFI network. In a certain environment, the above-mentioned four network signal may be strong or weak; and therefore, it is required to obtain different network signal strength information.

The current service power consumption obtaining module 304 is configured to obtain a power consumption value of a mobile phone using each service under the current network, and to calculate how long a battery may be used in accordance with the current using manner.

The power consumption state table maintenance module 306 is configured to maintain the relationships among different service types, network signal intensities and the power consumption. In the present embodiment, a corresponding table (referred to as a power consumption state table) with regard to different service types, network signal intensities and the power consumption is build in mobile phone software. In the present embodiment, power consumption state table of different service is dynamically maintained, when in different environments, the mobile phone may get the latest power consumption values regarding different services, and then update the table in correspondence to the current network and network signal intensity.

The network selection module 308 is configured to select, from networks with the same signal intensity, a network with minimum power consumption for the mobile phone to reside on according to the current power consumption values, so as to prolong the stand-by time of the mobile phone. For example, the mobile phone resides in network A, and determines that, according to the network signal intensity obtained by the network signal intensity obtaining module 302, there is a network B of which the signal intensity is similar as that of network A in which the mobile phone resides in the current environment; moreover, according to the records in the power consumption state table, the power consumption of network B in the current signal intensity is lower than the current power consumption of the mobile phone, and thus the network selection module 308 selects the resident network B for the mobile phone.

Embodiment 4

The present embodiment provides a method for selecting a network on which a multimode terminal is to reside, and the method may be realized via the device as claimed in the above-mentioned embodiment 1 to embodiment 3

Figure 4:
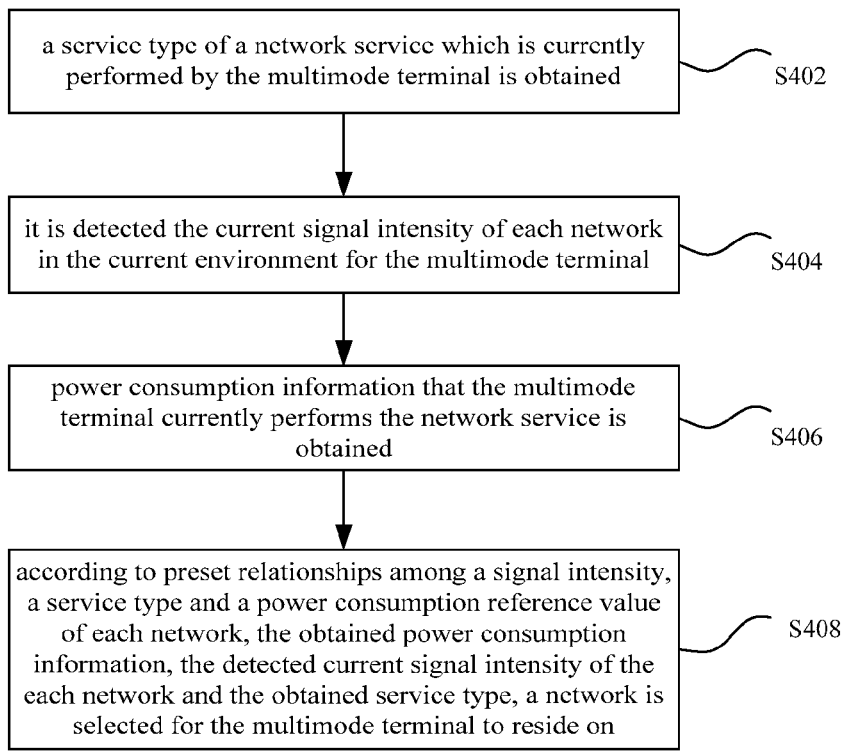
FIG. 4 is a flowchart of a method for selecting a network on which a multimode terminal is to reside according to an embodiment of the disclosure.

FIG. 4 is a flowchart of a method for selecting a network on which a multimode terminal is to reside according to an embodiment of the disclosure; and as shown in FIG. 4, the method for selecting the network on which the multimode terminal is to reside according to an embodiment of the disclosure mainly comprises the following step S402 to step S408.

Step S402, a service type of a network service which is currently performed by the multimode terminal is obtained.

Step S404, it is detected the current signal intensity of each network in the current environment for the multimode terminal.

Step S406, power consumption information that the multimode terminal currently performs the network service is obtained.

Step S408, according to preset relationships among a signal intensity, a service type and a power consumption reference value of each network, the obtained power consumption information, the detected current signal intensity of the each network and the obtained service type, a network is selected for the multimode terminal to reside on, wherein the selected network is a network with minimum power consumption reference value, which is corresponding to the current signal intensity and the current service type, in networks in each of which a current signal intensity can ensure the network service is performed.

In the embodiment of the disclosure, the above-mentioned device for selecting the network on which the multimode terminal is to reside selects, according to the obtained signal intensity of each network, the relationships among the service type, the signal intensity and a power consumption reference value the a network service, a network, of which the power consumption is low and the signal intensity can ensure a user to use the network service currently, for the multimode terminal to reside on. Thus when the network service is ensured to be performed, the power consumption of the multimode terminal is reduced as far as possible and the electric quantity of the multimode terminal is saved, and thus the stand-by time of the multimode terminal is prolonged.

In a preferred implementation of the present embodiment, selecting the network for the multimode terminal to reside on comprises: if signals of multiple networks are detected, and current signal intensities of the multiple networks are all less than a threshold, the multiple networks are taken as candidate networks, and the network is selected for the multimode terminal to reside on from the candidate networks; and if signals of multiple networks are detected, and one or more networks of which the current signal intensities are not less than the threshold exist in the multiple networks, the one or more networks of which the current signal intensities are not less than the threshold are taken as the candidate networks, and the network is selected for the multimode terminal to reside on from the candidate network.

In a preferred implementation of the present embodiment, the network for the terminal to reside on may be selected from the candidate networks via the following ways:

step 1, querying the relationships to respectively obtain, at the same signal intensity, a power consumption reference value p, wherein the power consumption reference value p is corresponding to a service type of the network service, which is currently performed and is corresponding to each network in the candidate networks; and step 2, a network is selected for the terminal to reside on from the candidate networks, wherein the power consumption reference value corresponding to the selected network is minimal.

In the above-mentioned preferred implementation, preferably, when a network is selected, dependency of a service type on signal intensity may also be considered. Therefore, in a preferred implementation of the present embodiment, before selecting the network for the multimode terminal to reside on from the candidate networks, the method further comprises: a relationship between a preset service type and a signal intensity dependence weight is queried, and a signal intensity dependence weight x corresponding to the service type of the network service which is currently performed is obtained, wherein $0 \leq x \leq 1$. In the preferred implementation, selecting the network for the multimode terminal to reside on from the candidate networks may comprise the following steps:

(1) it is respectively calculated a signal intensity and a power consumption comprehensive reference value v for each network in the candidate networks according to the following formula:

$$v=x*e+(1-x)/p,$$

where e is a normalization value of the current signal intensity in the detected network; and (2) a network with maximal signal intensity and power consumption comprehensive reference value is selected as the network on which the multimode terminal is to reside.

In the above-mentioned preferred implementation, if the number of the service type of the network service which is currently performed by the multimode terminal is more than one, the obtained signal intensity dependence weight is a maximal signal intensity dependence weight in signal intensity dependence weights corresponding to the more than one service types.

In the present embodiment, in order to dynamically update the relationships of the power consumption, before selecting the network, power consumption information that the multimode terminal currently performs the network service may also be obtained.

In the preferred implementation of the present embodiment, power consumption information that the multimode terminal currently performs the network service is obtained; and a current power consumption value of the multimode terminal is determined according to an obtained electric quantity consumption speed of the multimode terminal in a current predetermined interval. For example, a current voltage value of a battery may be read by a lower layer drive code of the multimode terminal, electric quantity may be obtained via querying a discharge curve table according to the voltage value, and the current power consumption of the multimode terminal may be obtained according to the electric quantity consumption speed. Preferably, an average value of current within three minutes may be taken as the current power consumption value.

Preferably, in an embodiment, after obtaining power consumption information that the multimode terminal currently performs the network service, a power consumption, in the relationships, corresponding to a current signal intensity of a current network on which the multimode terminal resides and the service type of the network service which is currently performed may also be updated.

Embodiment 5

Figure 5:
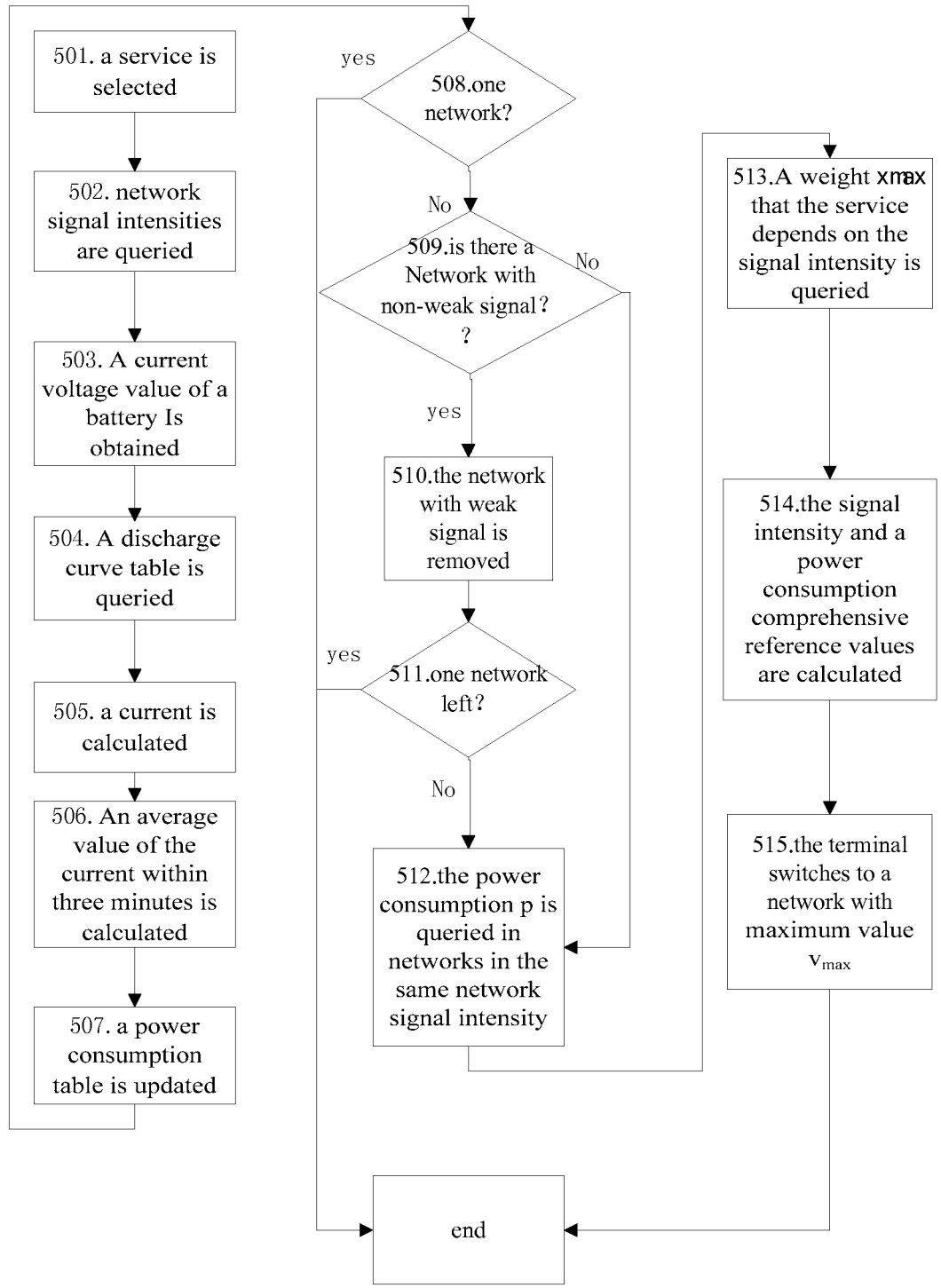
FIG. 5 is another flowchart of a device for selecting a network on which a multimode terminal is to reside according to a preferred embodiment of the disclosure.

The present embodiment takes a mobile phone as an example to describe a method for selecting a network on which a multimode terminal is to reside. FIG. 5 is a flowchart of a method for selecting a network on which a multimode terminal is to reside according to an embodiment of the disclosure, and as shown in FIG. 5, the method mainly comprises the following steps:

step 501, a service is selected. A current service used by a mobile phone is obtained; if a plurality of several services are running on the mobile phone at the same time, which service priority is given to may be determined according to a preset weight value of each service so as to select a network, and the higher the instantaneity is, the higher the weight value is. For example, the instantaneity of a video call is higher than a download task, and therefore the weight value of the video call is higher than the download task;

step 502, network signal intensities are queried. In the current environment, network signal intensities in all networks are obtained, and it is assumed same to be e after the normalization;

step 503, a lower layer drive code reads a current voltage value of a battery;

step 504, an electric quantity is obtained by querying a discharge curve table according to the current voltage value;

step 505, a current is calculated according to the obtained electric quantity;

step 506, the current power consumption of the mobile phone is calculated according to an electric quantity consumption speed. In the present embodiment, an average value of the current within three minutes is taken as a current power consumption value;

step 507, a power consumption state table is dynamically adjusted according to the current power consumption value. In a case that the signal intensity is the same and the network is the same, the power consumption of a terminal may also be different in different environments. Therefore, in the present embodiment, the obtained power consumption of the terminal may serve as a parameter for dynamically adjusting the power consumption state table. For example: in a case that the signal intensity of a GSM network is the same, the power consumption for running QQ on a mobile phone may be different in a bustling downtown and in a desolated area of the suburb, and the later is lower. Therefore, it is requires to dynamically adjust the power consumption state table according to environments;

step 508, according to the network signal intensity, it is detected whether there is only one network to be selected; if yes, exit without selecting a network; otherwise, turn to step 509;

step 509, it is detected whether there is a network with non-weak signal; if no, a best network from networks of which network signals are all weak may only be selected according to the power consumption, and turn to step 512; and if yes, turn to step 510;

step 510, one or more networks with weak signal are removed from a to-be-selected network combination, and perform the next detection;

step 511, it is detected whether there is only one network in the to-be-selected network after removing the one or more networks with weak signal; if there is only one network, directly exit; if there is more than one networks, perform the next step in order to ensure a user to use and resides in a network with strong signal;

step 512, the power consumption state table is queried to obtain power consumption reference values in the same network signal intensity, wherein the power consumption reference values are respectively corresponding to current services in every selectable networks. After normalizing, it is assumed the value is to be p;

step 513, a weight table that the current service depends on the signal intensity is queried (a service with high instantaneity has higher requirements on a signal, such as video call, the weight ratio is greater). The value of the weight is in percentage. It is assumed that the value is x; if multiple services coexist, taking a maximum value, i.e. $x_{max}=\max\{x1, x2\ldots\}$;

step 514, the signal intensity and a power consumption comprehensive reference values $v=x_{max}*e+(1-xmax)/p$ are calculated, where e is a normalization value of the obtained network signal intensity in step 502; and step 515, a maximum value $v_{max}$ is selected from the calculated vs. A network is selected according to the maximum value.

It should be noted that the network selection strategy of the present embodiment is mainly based on power consumption, the introduction of $x_{max}$ is only to ensure better user experience; therefore, generally, the value is relatively small, and in this way, v is mainly decided by the right-half portion of the plus sign.

From the description above, it can be seen that by means of the technical solution provided by the above-mentioned one or more embodiments, a mobile terminal selecting a network according to the service power consumption can be realized; and by analysing the service, power consumption and network signal intensity, a network with minimum power consumption may be dynamically selected for a user to reside on without affecting the use of the user, thus prolonging the endurance time of a smart phone.

Apparently, those skilled in the art shall understand that the above modules and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and performed by the calculating device, in some cases, can perform the shown or described step in sequence other than herein, or they are made into integrated circuit module respectively, or a plurality of modules or steps thereof are made into one integrated circuit module. In this way, the disclosure is not restricted to any particular hardware and software combination.

The above description is only preferred embodiments of the disclosure and is not intended to limit the disclosure, and the disclosure can have a variety of changes and modifications for those skilled in the art. Any modification, equivalent replacement, or improvement made within the spirit and principle of the disclosure shall all fall within the protection scope of the disclosure.

What is claimed is:

1. A method for selecting network on which multimode terminal is to reside, comprising:
obtaining a service type of a network service which is currently performed by the multimode terminal;
detecting a current signal intensity of each network in current environment for the multimode terminal;
obtaining power consumption information about power consumed by the multimode terminal when the multimode terminal currently performs the network service; and
selecting, according to preset relationships among a signal intensity, a service type and a power consumption reference value of each network, the obtained power consumption information, the detected current signal intensity of the each network and the obtained service type, the network on which the multimode terminal is to reside, wherein the selected network is a network with minimum power consumption reference value, which is corresponding to the current signal intensity and the current service type, in networks in each of which a current signal intensity can ensure the network service is performed.

2. The method according to claim 1, wherein selecting the network on which the multimode terminal is to reside comprises:
if signals of multiple networks are detected, and current signal intensities of the multiple networks are all less than a threshold, taking the multiple networks as candidate networks, and selecting a network on which the mobile terminal is to reside from the candidate networks; and
if signals of multiple networks are detected, and one or more networks of which current signal intensities are not less than the threshold exist in the multiple networks, taking the one or more networks of which the current signal intensities are not less than the threshold as the candidate networks, and selecting the network on which the mobile terminal is to reside from the candidate networks.

3. The method according to claim 2, wherein selecting the network on which the multimode terminal is to reside from the candidate networks comprises:
querying the relationships to obtain respectively, at the same signal intensity, a power consumption reference value p, wherein the power consumption reference value p is corresponding to a service type of the network service, which is currently performed and is corresponding to each network in the candidate networks; and
selecting a network on which the multimode terminal is to reside from the candidate networks, the selected network being with minimum power consumption reference value.

4. The method according to claim 3, wherein
before selecting the network on which the multimode terminal is to reside from the candidate networks, the method further comprises: querying a relationship between a preset service type and a signal intensity dependence weight, and obtaining a signal intensity dependence weight x corresponding to the service type of the network service which is currently performed, wherein $0 \leq x \leq 1$; and
selecting the network on which the multimode terminal is to reside from the candidate networks comprises:
calculating respectively a signal intensity and a power consumption comprehensive reference value v for each network in the candidate networks according to the following formula:

$$v = x*e + (1-x)/p,$$

where e is a normalization value of the current signal intensity in the detected network; and
selecting, from the candidate networks, a network with maximal signal intensity and power consumption comprehensive reference value as the network on which the multimode terminal is to reside.

5. The method according to claim 4, wherein if the number of the service type of the network service which is currently performed by the multimode terminal is more than one, the obtained signal intensity dependence weight is a maximal signal intensity dependence weight in signal intensity dependence weights corresponding to the more than one service types.

6. The method according to claim 1, wherein obtaining the power consumption information about the power consumed by the multimode terminal when the multimode terminal currently performs the network service comprises:
determining, by obtaining an electric quantity consumption speed of the multimode terminal in a current predetermined interval, a current power consumption value of the multimode terminal.

7. The method according to claim 6, wherein after obtaining the power consumption information about the power consumed by the multimode terminal when the multimode terminal currently performs the network service, the method further comprises:
updating a power consumption value, in the relationships, corresponding to a current signal intensity of a current network on which the multimode terminal resides and the service type of the network service which is currently performed.

8. The method according to claim 2, wherein obtaining the power consumption information about the power consumed by the multimode terminal when the multimode terminal currently performs the network service comprises:
determining, by obtaining an electric quantity consumption speed of the multimode terminal in a current predetermined interval, a current power consumption value of the multimode terminal.

9. The method according to claim 3, wherein obtaining the power consumption information about the power consumed by the multimode terminal when the multimode terminal currently performs the network service comprises:
determining, by obtaining an electric quantity consumption speed of the multimode terminal in a current predetermined interval, a current power consumption value of the multimode terminal.

10. The method according to claim 4, wherein obtaining the power consumption information about the power consumed by the multimode terminal when the multimode terminal currently performs the network service comprises:
determining, by obtaining an electric quantity consumption speed of the multimode terminal in a current predetermined interval, a current power consumption value of the multimode terminal.

11. The method according to claim 5, wherein obtaining the power consumption information about the power consumed by the multimode terminal when the multimode terminal currently performs the network service comprises:

determining, by obtaining an electric quantity consumption speed of the multimode terminal in a current predetermined interval, a current power consumption value of the multimode terminal.

12. A device for selecting network on which multimode terminal is to reside, comprising:
- a service selection module, configured to obtain a service type of a network service which is currently performed by the multimode terminal;
- a detection module, configured to detect a current signal intensity of each network in the current environment for the multimode terminal;
- a current power consumption obtaining module, configured to obtain power consumption information about power consumed by the multimode terminal when the multimode terminal currently performs the network service; and
- a network selection module, configured to select, according to preset relationships among a signal intensity, a service type and a power consumption reference value of each network, the power consumption information obtained by the current power consumption obtaining module, the detected current signal intensity of the each network and the obtained service type, the network on which the multimode terminal is to reside, wherein the selected network is a network with minimum power consumption reference value, which is corresponding to the current signal intensity and service type, in networks in each of which a current signal intensity can ensure that the network service is performed.

13. The device according to claim 12, wherein the device further comprises:
- a power consumption state maintenance module, configured to update, according to the power consumption information obtained by the current power consumption obtaining module, a power consumption, in the relationships, corresponding to a current signal intensity of a current network on which the multimode terminal resides and the service type of the network service which is currently performed.

14. A multimode terminal, comprising the device as claimed in claim 12.

* * * * *